Nov. 2, 1965  P. K. BODGE  3,214,988
MECHANICAL POWER AMPLIFIERS
Filed Dec. 7, 1962  4 Sheets-Sheet 1
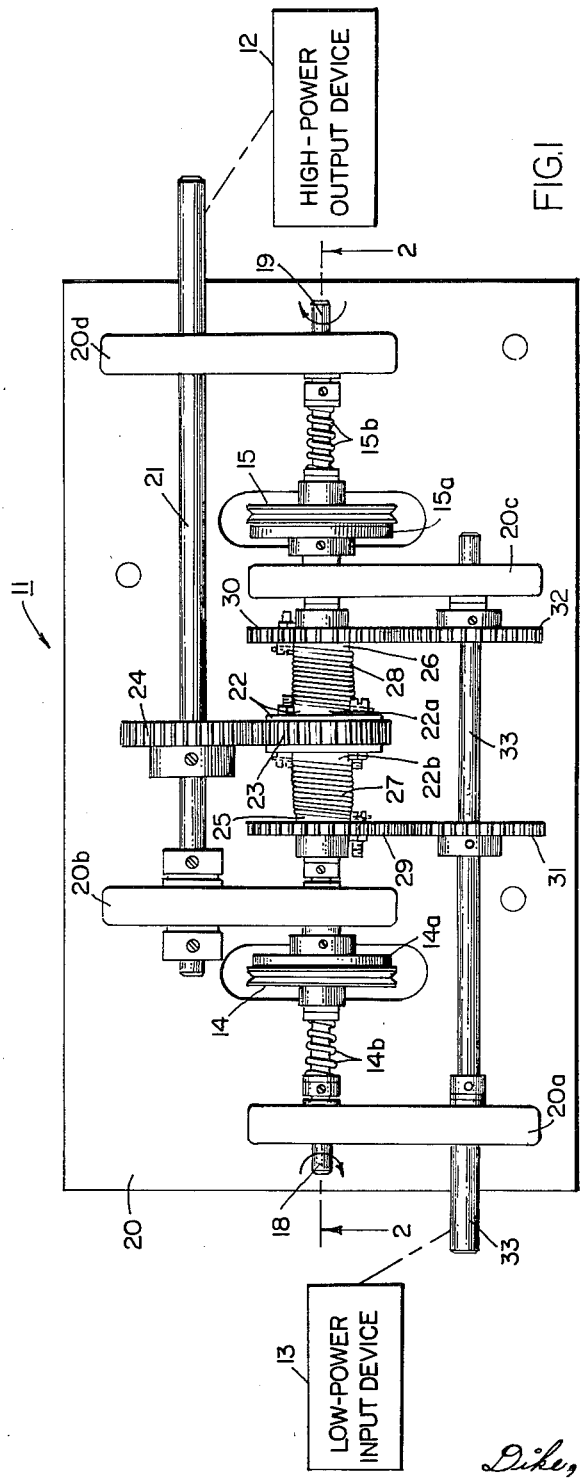
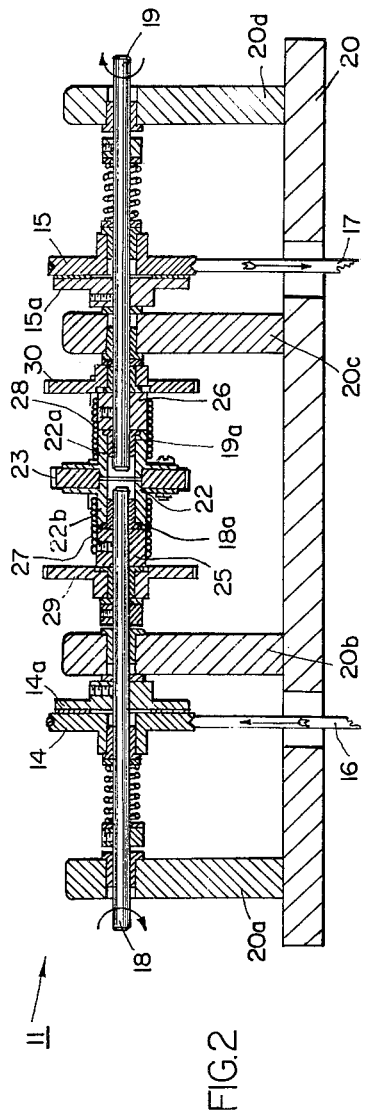
INVENTOR.
PHILIP K. BODGE
BY
Dike, Thompson, Bronstein & M⸍rose
ATTORNEYS Nov. 2, 1965     P. K. BODGE     3,214,988
MECHANICAL POWER AMPLIFIERS Filed Dec. 7, 1962     4 Sheets-Sheet 2

INVENTOR.
PHILIP K. BODGE
BY
Dike, Thompson, Bronstein, & Rose
ATTORNEYS

Nov. 2, 1965 P. K. BODGE 3,214,988
MECHANICAL POWER AMPLIFIERS

Filed Dec. 7, 1962 4 Sheets-Sheet 3

INVENTOR.
PHILIP K. BODGE
BY
Dike, Thompson, Bronstein & Mrose
ATTORNEYS

Nov. 2, 1965    P. K. BODGE    3,214,988
MECHANICAL POWER AMPLIFIERS
Filed Dec. 7, 1962    4 Sheets—Sheet 4

INVENTOR.
PHILIP K. BODGE
BY
Dike, Thompson, Bronstein & Mrose
ATTORNEYS

United States Patent Office

3,214,988
Patented Nov. 2, 1965

3,214,988
MECHANICAL POWER AMPLIFIERS
Philip K. Bodge, Swampscott, Mass.
(P.O. Box 6, Belmont, Mass.)
Filed Dec. 7, 1962, Ser. No. 243,138
18 Claims. (Cl. 74—388)

The present invention relates to improvements in precision motive devices and, in one particular aspect, to novel and improved mechanical driving mechanisms of inexpensive manufacture and high power capacity in which unique spring-clutch units effect swift and accurate regulation of powered output movements under command of control signals of low power level.

There are numerous and important design areas, of which that involving automatic control of machine tools in relation to workpieces is typical, in which the exacting requirements for the needed motive devices are not readily met by existing forms of equipment. By way of example, such applications can demand high-torque outputs, rapid speeds of synchronous motion, virtually instantaneous starting and stopping, large stalling torques, high levels of operating precision, and responses to low-level control signals; many of these requirements tend to be incompatible with one another and their combination is not known to be satisfied by existing motive devices of uncomplicated and inexpensive construction. A simple form of motive device capable of exhibiting these characteristics is of course highly desirable for very many system applications involving servomechanisms, such as steering or antenna-tracking systems. In accordance with the present teachings, a motive device of this character is produced using a non-synchronous rotational power source, which may be of any convenient type such as an electric motor, an internal combustion engine, or the like, and which transmits power to an output shaft under the exact control exercised through a unique spring-clutch assembly. Apparatus of this general type has been proposed earlier, although only relatively coarse control has been involved, due largely to the inherent deficiencies of known spring clutches. These clutches are commonly in the form of helical springs proportioned to grasp and clutch firmly with nearby cylindrical surfaces when wound or unwound from a predetermined neutral winding condition; clutches of this known type are essentially "on-off" devices and possess backlash or deadband characteristics which defeat efforts to suppress error and to shorten response times. Moreover, the springs and clutching surfaces of the prior structures have been of critical proportions, requiring careful and costly machining and adjustment to avoid unpredictable operation, overshoot, oscillation or drift, and to prevent large output forces from being reflected back to the control site. The present invention overcomes such difficulties in part through a special pre-adjustment and setting of opposed biasing forces in a spring-clutch unit, and in part through mechanical feedback provisions, the latter also permitting variations of the operation to include such modes as bi-stable and tri-stable operations.

Accordingly, it is one of the objects of the present invention to provide novel and improved motive devices of relatively inexpensive construction which produce high-torque mechanical outputs in response to control signals of low torque or force levels.

A further object is to provide novel and improved power transmission apparatus of the spring-clutch type wherein output movements are precisely related to mechanical input control signals.

Another object is to provide spring-clutched power transmissions having large stalling or locking torques and high speeds of accurate response to minute control signals, the input being substantially isolated from reflections of the large forces developed at the output.

Still further, it is an object to provide a unique precision motive device having a high bandwidth of responses to small control signals, and lending itself to driftless synchronous, bi-stable and tri-stable operations.

In addition, it is an object to provide improvements in spring-clutch mechanisms which vastly increase the precision of utility of power transmissions regulated by such mechanisms.

By way of a summary account of practice of this invention in one of its aspects, a relatively high-power electric motor is coupled in driving relationship to two power shafts, turning them in opposite angular directions at the same relatively high speed, and a revolvable output shaft is disposed for selectable rotation with one or the other of these power shafts under control of a unique spring-clutch assembly. The latter assembly includes a helical spring unit which has two wound portions each individually disposed for actuation into frictional clutching engagement which will directly couple a different one of the power shafts with the output shaft. Characteristically, each of the wound portions of the helical spring unit will clutch in one angular direction only, while slipping freely in the other, and this has suggested to others that such spring clutches might be employed for generally similar bi-directional control of power to an output shaft. However, the spring-clutching is essentially a full-on or full-off matter in prior devices of this type, and this has tended toward rough and erratic operation, with chatter between the on and off states (i.e. clutched and declutched states) of the springs, and with serious loss of precision due to the widely-varying backlash occurring because the clutching of one spring cannot take place simultaneously with de-clutching of the other. The unique spring-clutch unit of the present invention is distinctive and particularly advantageous in that it achieves an essentially proportional, rather than on-off, control. This results from pre-set counterbalancing of unwinding forces between the two portions of the helically-wound spring unit, the properly counterbalanced relationship being evidenced by spring-clutch slippages which just prevent the power shafts from turning the output shaft under no-load conditions. This critical relationship is preserved by a train of gears which maintains the critically-unwound setting while at the same time permitting both spring portions to be articulated angularly to regulate the desired clutched rotations of the output shaft in accordance with relatively small input torques or forces. Upon cessation of any such input torques or forces, the pre-set counterbalanced relationship is automatically resumed and the output movements terminate. The quiescent condition is preserved by a negative feedback of a portion of the output power to the input, whereby drift is suppressed and desirably large stalling torques are developed.

Although the features of this invention which are believed to be novel are set forth in the appended claims, further details as to preferred practices of the invention, as well as to the objects and advantages thereof, may be most readily comprehended through reference to the following description taken in connection with the accompanying drawings, wherein:

FIGURE 1 presents a plan view of an improved motive apparatus constructed in accordance with the present teachings, together with block-diagrammed representations of associated input and output devices;

FIGURE 2 is a transverse cross-section of the same apparatus, taken along section line 2—2 in FIGURE 1;

Figure 3:
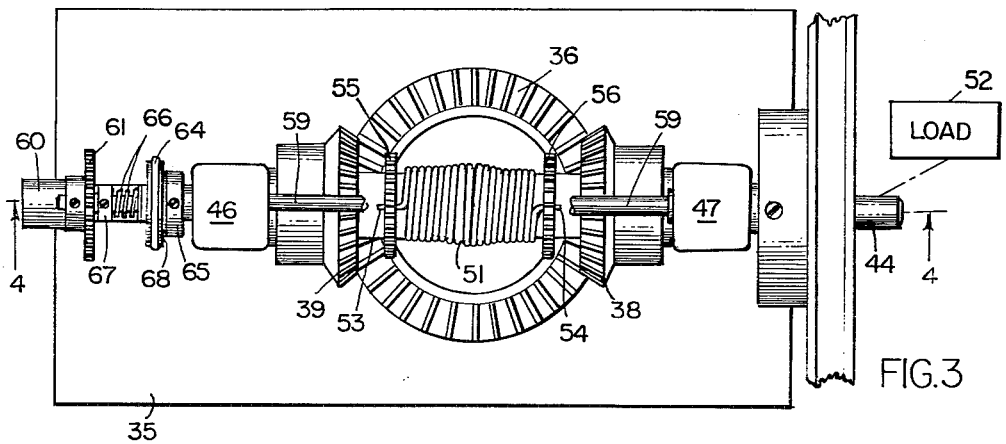
FIGURE 3 depicts part of an alternative motive apparatus in compact form powered by an electric motor and including a preferred single-spring clutch unit and feedback provisions.

The embodying equipment 11 portrayed in FIGURES 1 and 2 is designed to supply rotational power outputs to a high-power output device 12 in response to commands of a relatively low-power input device 13. Device 13 may comprise a low-torque synchro receiver, for example, the angular orientations of which are to be followed accurately and swiftly by a massive load, such as a large tracking antenna structure. For purposes of driving the load or output device 12, use is made of a conventional source of rotational power (not illustrated), which may be in the form of an electric or hydraulic motor, or internal combustion engine, or other prime mover. The source need not by synchronous, although it should be capable of supplying mechanical power continuously as needed, and should be of at least a predetermined minimum speed which, for a particular design of equipment, is related to the maximum speed at which the load would be driven. Operation of the equipment 11 depends upon its being supplied with rotational power simultaneously in two different angular directions at about the same speed, and in the illustrated construction this is satisfied by rotation of the two aligned pulleys 14 and 15 in opposite directions by the oppositely driven belts 16 and 17 respectively (FIGURE 2). The pulleys 14 and 15 are revolubly mounted on bearings on the separate, but axially aligned, shafts 18 and 19, respectively, these shafts in turn being bearing-mounted for independent rotation in the upstanding support elements 20a–20d of framework 20. Clutch plates 14a and 15a, which are fastened directly to the respective shafts 18 and 19, are normally clutched with the adjoining pulleys 14 and 15, respectively, as the result of axial clutching thrust developed by the associated springs 14b and 15b. These two clutch assemblies insure that drastic overload conditions will merely result in clutch slippage; alternatively, such clutches may conveniently be part of the prime mover unit. With the prime mover operating, and the clutches engaged, axially aligned shafts 18 and 19 rotate in opposite directions at the same speed. Power is to be directed from one of these two shafts to the output shaft 21, the latter being shown in a convenient parallel relationship to the shafts 18 and 19 and mounted for rotation in bearings on supports 20b and 20d. Transmission of this power is selectably from one of the two aligned shafts to an intermediate rotatable bushing or hub 22, through the hub-mounted gear 23, and to the enmeshed output gear 24 affixed to the output shaft 21. As appears in FIGURE 2, the intermediate hub 22 is supported on bearings 18a and 19a at the ends of the two shafts 18 and 19, and is thus rotatable in relation to either of these shafts. Moreover, the hub possesses two cylindrical clutching portions, 22a and 22b, one to each side of the central gear 23. Adjacent to and collinear with these clutching portions are the two cylindrical clutching parts 25 and 26 affixed to and rotatable with the shafts 18 and 19, respectively, all of the cylindrical clutching surfaces preferably having about the same diameter. Driving connections between the clutch portions 25 and 22b or, alternatively, between clutch portions 26 and 22a, are established by helical springs 27 and 28, respectively. Each of these springs is closely wound and has an inner diameter normally slightly less than the outer diameter of the aforesaid cylindrical clutching portions. These helical springs thus tend to interfere with and grasp the cylindrical clutching surfaces which they encompass. In accordance with well known characteristics of spring clutches, any actuations of shafts 18 and 19 which cause their affixed cylindrical clutching portions 25 and 26 to tend to wind the springs 27 and 28 will cause them to grip both of their associated cylindrical clutching surfaces even more firmly. Movements which tend to unwind these springs will result in slippage. Whenever one of the springs is being wound, it seizes and immediately establishes a very strong and rigid one-way connection for transmission of power from one of the shafts 18 and 19 to the output shaft 21 and load 12. For these clutching purposes, each of the two springs 27 and 28 has one end tang secured fixedly in relation to the hub 22, and the opposite end tangs are each fastened to and angularly movable with different control gears 29 and 30, respectively. The latter gears are bearing-mounted on the shafts 18 and 19, in position for convenient fastening to the outer end tangs of the two springs.

A critical aspect of the spring clutching resides in an initial pre-set counterbalancing which is developed through the aforesaid control gears 29 and 30 as well as the further relatively adjustable gears 31 and 32 fixed with the input control shaft 33. Bearings in framework supports 20a and 20c permit rotational setting of shaft 33 and, with it, the two gears 31 and 32, by the input device 13. For the illustrated construction (FIGURE 1), a clockwise movement of input shaft 33, as viewed from the end coupled with the input device, occasions a simultaneous winding influence on spring 28 and unwinding influence on spring 27, these influences are reversed when the input shaft is urged counterclockwise. However, in the quiescent or neutral condition of the equipment, when no input control torque is experienced about the axis of input shaft 33, both spring-clutch sections 27 and 28 are partially unwound to a critical extent and develop slippage, the slippage forces being precisely counterbalanced so that no resultant turning torque is impressed upon hub gear 23 and output shaft 21. The critical partial unwinding of springs 27 and 28 results from angular adjustment of one of gears 31 and 32 relative to the other about the axis of their common shaft 33. Preferably, this angular adjustment is made with output shaft 21 decoupled from the driving hub gear 23, so that no load can be reflected upon the hub 22. While this condition prevails, the shafts 18 and 19 are torqued in opposite directions, by equal and opposite torques, such that spring 27 tends to wind tightly upon cylindrical clutch parts 25 and 22b and spring 28 tends to wind tightly upon cylindrical clutch parts 26 and 22a. One of the two gears 31 and 32 is loosened so that it is free to turn on the input shaft 33 while the other is held fixedly on the same shaft, and the loosened gear is then turned slowly relative to the other in a direction which tends to unwind both of the clutch springs 27 and and 28. At some point, both springs become sufficiently unwound so that they are incapable of clutching the counter-torqued shafts 18 and 19 to the intermediate hub 22, and the loosened gear is then locked tightly on shaft 33 so that it preserves its angular orientation in relation to the other gear on the same shaft. Under this pre-set operating condition, locked gears 31 and 32 keep the spring clutches just enough unwound to permit both counter-rotating shafts to rotate without jamming, and without turning the intermediate hub 22 in either direction. Accordingly, the output shaft 21, when connected, will not experience any driving torque under these equilibrium conditions.

In operation, the input shaft 33 may be rotated, in either angular direction, by small or large amounts or at a predetermined speed, and the loaded output shaft 21 will be accurately slaved to such movements. Assuming that input shaft 33 is turned clockwise, as viewed from the end coupled with the input device 13, both of the gears 31 and 32 move clockwise with it and turn both of the enmeshed control gears 29 and 30 counterclockwise. The loaded output shaft 21 at first tends to prevent rotation of the hub assembly 22, and this has the effect of promoting a tightening or winding of spring 28 and causing a loosening or unwinding of the spring 27. Immediately, the aforesaid equilibrium condition is upset and counterclockwise-rotating power shaft 19 drives assembly 22 counterclockwise through spring 28; consequently, the output shaft 21 is moved clockwise. It should be appreciated that the speed of rotation of power shaft 19 is selected to be high enough to prevent locking torques being experienced by the input shaft 33, that is, the power shaft 19 instantly follows the movements of gear 30 and prevents its becoming jammed. As soon as the shaft 19 drives hub assembly 22 sufficiently to restore the equilibrium conditions in the spring clutches, this shaft is automatically de-coupled. Thus, any input motion is closely followed, in a succession of minute and inperceptible steps of the character described; conditions are reversed for counterclockwise input movements, whereupon the power shaft 18 then drives the assembly 22 and output shaft 21 through the spring 27 while the spring clutch element 28 experiences slippage. At times when no input signals are applied to shaft 33 from input device 13, no appreciable torques are sensed at the input because the "overrunning" frictions of the spring clutch elements 27 and 28 are of self-cancelling effect and because the forces transmitted through bearings 18a and 19a are likewise mutually cancelling for the same reason (i.e. the power shafts 18 and 19 rotate in opposite directions simultaneously). It will be apparent that various gear ratios involved in this equipment may be varied to achieve desired effects in some applications; likewise the speeds of power shafts 18 and 19 may differ for purposes of differing the output shaft response speeds in the two permissible directions of movement. Auxiliary overload clutches 14a and 15a, or their equivalents, are of particular advantage where the mechanisms are to be protected from overloads occurring when a high-inertia load is to be rapidly accelerated from standstill or reversed in direction of rotation.

Figure 4:
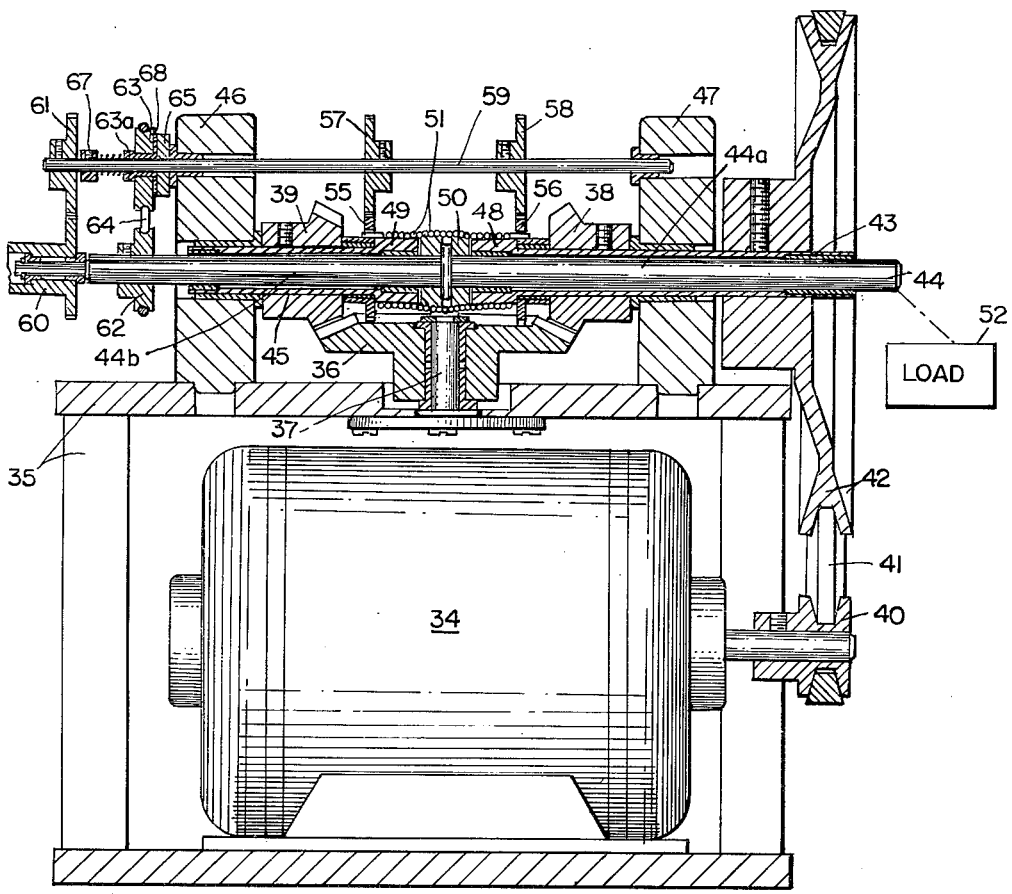
FIGURE 4 is a transverse cross-section of the apparatus of FIGURE 3, taken along the section line 4—4, with portions shown in full as an aid to clarity.

The embodiment depicted in FIGURES 3 and 4 is of a compact form including an electric motor 34 as the prime mover, the motor being mounted on a framework 35 and continuously rotating a framework-mounted bevel gear 36 at a relatively high speed about a stationary vertical shaft 37. Collinear bevelled pinions 38 and 39 enmeshed with gear 36 at diametrically opposite positions are rotated at the same speed and in opposite directions, the power flow being from motor pulley 40 through belt 41 to pulley 42. The latter pulley is affixed to a hollow power shaft 43 which is bearing-mounted for rotation about one part 44a of a concentric central output shaft 44, and the rotated hollow shaft 43 rotates pinion 38. In turn, bevel gear 36 is rotated and revolves the pinion 39 which is affixed to the hollow power shaft 45 and may rotate therewith about another part, 44b, of support shaft 44. Supports 46 and 47 mount the collinear concentric shafts on the framework 35, and the assembly of parts as thus far described is arranged to preserve the adjacent collinear cylindrical ends 48 and 49 of the two power shafts 43 and 45 in an axially spaced relationship. End 48 and 49 are preferably somewhat enlarged, to form desired cylindrical clutch surfaces, and between them is disposed a separate crowned hub or drum, 50, which is pinned securely to the output shaft 44. The crowned peripheral surfaces of drum 50 and the cylindrical surfaces of shaft ends 48 and 49 form two sets of clutching surfaces which, in coaction with a single helical spring clutch member 51, are capable of selectably connecting one or the other of the counter-rotating hollow shafts 43 and 45 in driving relationship with the output shaft 44 and external load 52. Spring 51 normally tends to interfere with cylindrical surfaces 48 and 49 and, because the crowned drum 50 has an even greater diameter, the interference is more pronounced at that site. The tangs 53 and 54 at opposite ends of the spring 51 are trapped in openings in two control gears 55 and 56, respectively, which are rotatably supported in bearings on the respective power shaft 45 and 43. These control gears are in turn separately enmeshed with two further gears, 57 and 58, which are angularly interlocked on the control shaft 59 pivoted in supports 46 and 47. As in the case of the construction of FIGURES 1 and 2, the spring clutching is initially pre-set to develop an equilibrium condition. For this purpose, the output shaft is left unloaded, and one of the gears 57 and 58 is unlocked from shaft 59 and then moved angularly until the spring 51 is unwound enough to occasion equal and opposite slippages between the two counter-rotating shaft ends 48 and 49 and spring 51. The gears 57 and 58 are next locked in this advantageous angular relationship, the drum 50 and output shaft 44 remaining stationary despite the continuous opposite rotations of shafts 43 and 45. Under these pre-set or equilibrium conditions, the central portion of clutch spring 51 always remains tightly clutched to the drum 50, the initial unwinding not being sufficient to disturb this firm clutching effect. However, the spring clutch is not otherwise mechanically fastened to drum 50, and this advantageously makes possible its construction in the simple form of but a single helical spring. Drum 50 may be conically truncated on both sides of its center, rather than curved, in an alternative crowning configuration. Slight torques applied to control shaft 59 cause one or the opposite halves of the spring 51 to be actuated into a clutching relationship which connects either shaft 43 or shaft 45 to the drum 50 and output shaft 44. The equilibrium condition is restored immediately when such torques disappear, and drive of the output shaft is immediately halted also.

Input control forces may be applied to control shaft 59 directly or, as shown in FIGURES 2 and 3, by way of a control knob 60 having a peripheral gear portion in engagement with the gear 61 affixed to shaft 59. Control knob 60 is mounted in bearings on one end of the output shaft 44, an arrangement which is particularly convenient for the provision of feedback such as is described later herein with reference to FIGURE 9. Negative feedback, i.e. a transfer of output forces back to the input in direction to decrease or damp the output, is readily achieved by connecting the output shaft so that it always tends to rotate the control shaft 59 in direction opposite to that of the input signals. Pulleys 62 and 63, connected by belt 64, serve this function. However, the amount of such feedback must be small in relation to the input signals, and preferably should be accurately controllable, and it is for such reasons that pulley 63 is rotatably fixed to shaft 59 on a low-friction bearing 63A and is adjustably clutched to a clutch plate 65 affixed to shaft 59. The degree of clutch coupling may be regulated by adjusting the axial compression of biasing spring 66, through axial adjustment of lock collar 67 on shaft 59. An oiled felt disc 68 at the clutching interface between pulley 63 and plate 65 provides low-friction and substantially constant feedback torques of the desired low levels. Feedback of this continuous character is highly advantageous not only in suppressing any tendencies of the output shaft to overrun, because of inertia, but also in promoting large locking or stalling torques which prevent drift or other unintended movements of the output shaft. High stalling torques are of very pronounced importance in equipment which is to maintain precision, else errors can accrue during those intervals when no input signals are applied.

Figure 6:
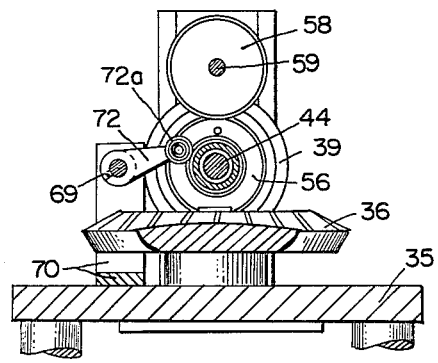
FIGURE 6 is a cross-section of the equipment of FIGURE 5, taken along section line 6—6 therein.
Figure 7:
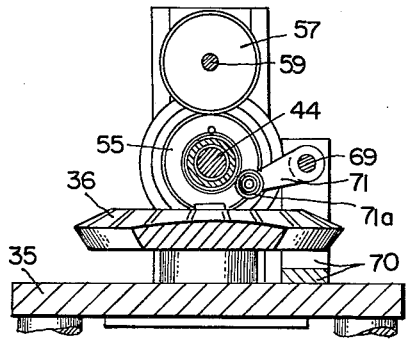
FIGURE 7 is a further cross-section of the equipment of FIGURE 5, taken along section line 7—7 therein.
Figure 5:
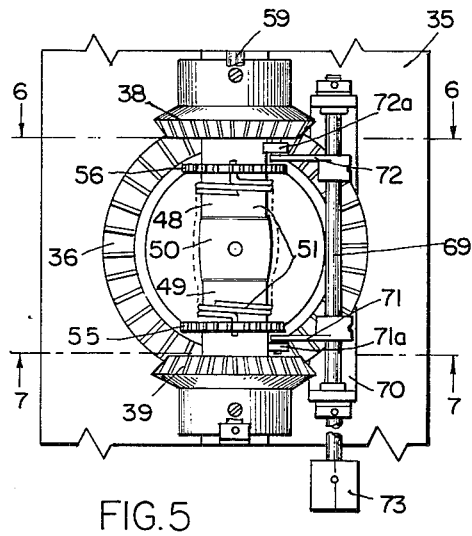
FIGURE 5 is a plan view of a portion of an assembly such as that of FIGURE 3, together with a special-purpose control mechanism for effecting desired rotations of the output shaft.

The modification illustrated in FIGURES 5, 6 and 7 exemplifies a control technique which may be an adjunct to or used in lieu of the input control arrangement depicted in FIGURES 3 and 4; inasmuch as the equipments are otherwise identical, the same reference characters are used to designate like or identical parts. The control is of a so-called "slewing" type, in that output shaft rotation is controlled both as to direction and speed in accordance with the sense and magnitude of the torque or force applied to a slewing control shaft 69. That shaft is journalled in the framework bracket 70 and carries two rigidly-attached crank arms, 71 and 72, which are axially and angularly spaced such that their ends ride on different cylindrical hubs of the control gears 55 and 56. Rollers 71a and 72a at these ends normally preserve the rolling frictions at a low level. Rollers 71a and 72a straddle the hubs of gears 55 and 56 in such a manner that a torque in one direction about the axis of shaft 69 will cause roller 71a alone to press more firmly, against the adjoining hub of gear 55, while a torque in the opposite direction about the axis of shaft 69 will cause roller 72a alone to press more firmly, against the adjoining hub of gear 56. The effect of any increased roller force is to increase the frictions effective between one of the counter-rotating powered shafs and the corresponding control gear which it supports, whereby the normal counterbalancing of friction-induced torques becomes imbalanced. Such imbalance immediately results in spring-clutching between one of the powered shafts and the output shaft, the direction and velocity of output shaft rotation being dependent upon the direction and magnitude of the applied control shaft torques. This construction may be varied such that the selectably variable imbalance may instead be achieved by other means, such as adjustable mechanical or electromagnetic clutches, or the like, interposed between pinion 39 and gear 55, and between pinion 38 and gear 56.

A knob 73 is shown at one end of shaft 69, permitting a direct manual control of the slewing action.

Figure 8:
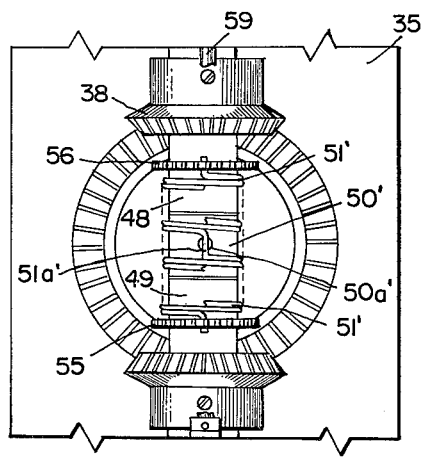
FIGURE 8 is a plan view of a portion of an alternative assembly such as that of FIGURE 3, illustrating another construction of a suitable spring-clutch unit.

In the apparatus of FIGURE 8, the structure is in general like that portrayed in FIGURES 3 and 4, and corresponding reference characters are thus employed to designate like parts, it being understood that the balance of the apparatus is as shown in FIGURES 3 and 4. The need for crowning or tapering of the peripheral surfaces of the hub or drum 50' is avoided, and yet but a single clutch spring member, 51', is involved. A positive anchoring of the drum 50' with spring 51', as is needed to promote the desired unwinding and unwinding effects, is obtained by forming the dowel pin 50a' with at least one projecting slotted end which engages and holds a short axial section 51a' disposed centrally of the spring. Drum 50' and enlarged power shaft ends 48 and 49 are of the same diameter, for optimum clutching purposes in this equipment. Other convenient techniques for fastening the center of a one-piece double clutch spring may of course be exploited.

Figure 9:
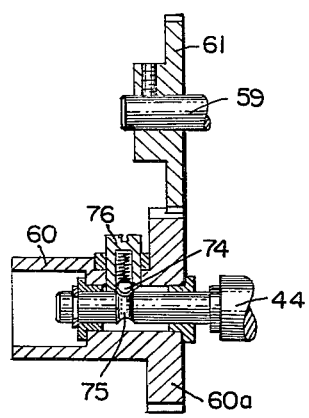
FIGURE 9 is a partial section of input control mechanisms embodying controlled positive feedback for an assembly such as that of FIGURES 3 and 4.

The detail illustrated in FIGURE 9 represents a modification of the input control knob assembly 60, of the apparatus of FIGURES 3 and 4, which facilitates the introduction of a controlled positive feedback. A trapped spring-loaded ball 74 carried by knob 60 normally rides loosely in the peripheral recess 75 near the end of output shaft 44. When positive feedback from output to input is desired, the knob 60 need only be pressed axially further onto the shaft 44, whereupon the ball develops a relatively high-friction engagement with the shaft and communicates related torques back to the input gear 61 and control shaft 59. Knob gear-section 60a is formed with sufficient width to permit the needed axial sliding movements of knob 60 without disconnection from the input gear 61. The amount of feedback is variable with radial adjustment of the setscrew-type holder 76 for ball 74. The inwardly depressed knob 60 thus serves to couple torques from the output shaft 44 to the input shaft 59 in a regenerative sense, i.e. one which augments or maintains the same sense of input as that which is applied at any time. Once the apparatus commences operation responsive to a brief input signal, it continues to run in one direction until the input is changed externally to command a different direction of output shaft rotation. This operation is a characteristically bistable one. Various forms of mechanical or electromechanical couplings may obviously be adopted to serve the needs of positive feedback. Both positive and negative feedback can be utilized to advantage in a tri-stable device, provided there is at least a small "dead-band" or "backlash" associated with the dominant positive feedback. By way of example, such a backlash may be readily created between the gears 60a and 61, there being substantially no such backlash between the negative feedback pulleys 62 and 63. A tri-stable device of this nature will remain substantially driftless in a null or quiescent state, or may be triggered into stable operations involving one or the opposite directions of output shaft rotation. Those versed in the art will understand that the backlash or dead-band effect may be produced in other ways, such as by the play between spaced mechanical stops.

Figure 10:
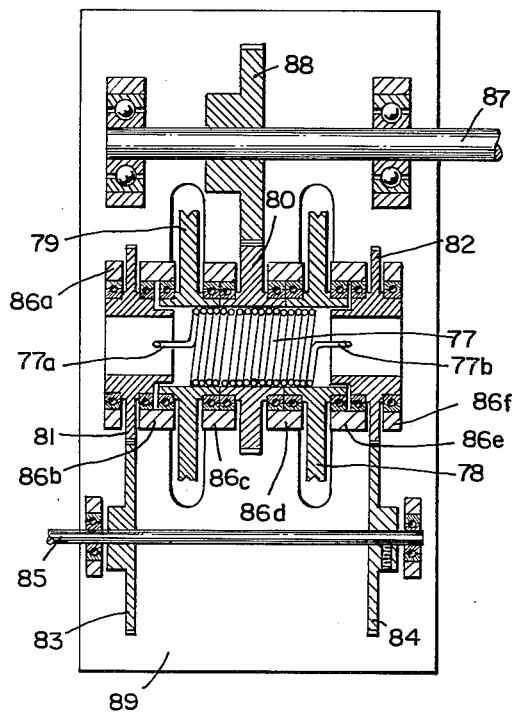
FIGURE 10 is a section, in plan, of an alternative embodiment of regulated motive equipment, in which the spring-clutch mechanism involves clutching about the outer peripheries of the spring units.

The bi-directional motive mechanism appearing in FIGURE 10 is of a modified construction incorporating a helical clutch spring 77 which clutches about its outer, rather than inner, periphery. Accordingly, the cooperating counter-rotating power members 78 and 79, and the output member 80, are designed for clutching engagements by spring 77 about their inner peripheries. Members 78 and 79 are of a pulley-driven type. Gears 81 and 82 at axial ends of the spring are locked with end tangs 77a and 77b of the helical clutch spring, and these gears are in turn locked angularly in relation to one another by way of the control gears 83 and 84 locked to input control shaft 85. Bearing hangers 86a–86f support the rotatable elements on framework 89, as shown. The internal periphery of power output member 80 is crowned inwardly, to produce the needed locking effect with the center of spring 77. Power output shaft 87 is driven in accordance with input shaft commands, through gear 88 enmeshed with power output member 80. Operation of this apparatus is generally like that of the equipment of FIGURES 1 and 2, although the single-spring clutching provisions are like those of the embodiment of FIGURES 3 and 4 (except arranged inside-out, mechanically). Spring 77 is initially of a configuration which fits tightly within the members 78, 79 and 80; subsequently, this spring is wound somewhat to achieve a pre-set equilibrium condition wherein both ends of the spring slip in relation to the power members 78 and 79 and wherein the clutching forces counterbalance one another so that the output member 80 experiences no net torques unless input torques are applied to the input shaft 85.

The specific embodiments of the invention herein disclosed are, of course, of a descriptive rather than a limiting nature, and various changes, combinations, substitutions or modifications may be employed in accordance with these teachings without departing either in spirit or scope from this invention in its broader aspects.

What I claim as new and desire to secure by Letters Patent of the United States is:

1. Precision motive apparatus comprising an angularly movable output member, motive means including two power members for simultaneously developing torques for powering said output member in different angular directions, clutch means including two one-way clutch portions each selectably adjustable to clutch a different one of said power members in driving relationship to said output member, each of said adjustable clutch portions including resiliently biased clutching means for clutching said output member with one of said power members, means interconnecting said resiliently biased clutching means of both of said clutch portions in a resiliently counterbalanced relationship to one another wherein said clutch portions tend to slip with substantially the same slippage torques between said output member and each of said power members, and input control means for selectably increasing the clutching forces in either of said two one-way clutch portions to unbalance said counterbalanced relationship and, thereby, to clutch one of said power members with said output member while de-clutching the other of said power members therefrom.

2. Precision motive apparatus as set forth in claim 1 further comprising feedback means actuating said input control means to unbalance said counterbalanced relationship in accordance with net torques experienced by said output member.

3. Precision motive apparatus comprising an angularly movable output member, motive means including two power members both capable of developing torques simultaneously for powering said output members in different angular directions, clutch means including two coiled clutch portions each selectably windable to clutch a different one of said power members in driving relationship to said output member, means interconnecting said coiled clutch portions in a counterbalanced wound relationship wherein the windings of said portions tend to slip with substantially the same slippage torques between said output member and each of said power members, and input control means for selectably increasing the clutching forces in either of said two clutch portions to unbalance said counterbalanced relationship and, thereby, to clutch one of said power members with said output member while de-clutching the other of said power members therefrom.

4. Precision motive apparatus comprising an angularly movable output member, motive means including two power members both capable of developing continuous torques simultaneously for powering said output member in different angular directions, clutch means including two coiled clutch portions each selectably windable to clutch a different one of said power members in driving relationship to said output member, means interconnecting said coiled clutch portions in a counterbalanced wound relationship wherein the windings of said portions tend to slip with substantially the same slippage torques between said output member and each of said power members, input control means for selectably increasing the clutching forces in either of said two clutch portions to unbalance said counterbalanced relationship, and, thereby, to clutch one of said power members with said output member while de-clutching the other of said power members therefrom, and feedback means continuously actuating said input control means in accordance with net torques experienced by said output member and in direction to reduce the unbalance in said unbalanced relationship.

5. Precision motive apparatus comprising an angularly movable output member, motive means including two power members both capable of developing continuous torques simultaneously for powering said output member in different angular directions, clutch means including two coiled clutch portions each selectably windable to clutch a different one of said power members in driving relationship to said output member, angularly movable means interconnecting said coiled clutch portions in a counterbalanced wound relationship wherein the windings of said portions tend to slip with substantially the same slippage torques between said output member and each of said power members, and input control means for selectably applying torques to said clutch portions through said angularly movable interconnecting means to unbalance said counterbalanced relationship, and, thereby, to clutch one of said power members with said output member while de-clutching the other of said power members therefrom.

6. Precision motive apparatus comprising an angularly movable output member, motive means including two power members both capable of developing torques simultaneously for powering said output in different angular directions, clutch means including two coiled spring-clutch portions each selectably windable to clutch a different one of said power members in driving relationship to said output member, means angularly interconnecting said output member with one part of each of said spring-clutch portions, means angularly interconnecting different parts of said spring-clutch portions with one another in a counterbalanced wound relationship wherein the windings of said portions tend to slip with substantially the same slippage torques between said output member and each of said power members, and input control means for selectively increasing the clutching forces in either of said clutch portions to unbalance said counterbalanced relationship, and, thereby, to clutch one of said power members with said output member while de-clutching the other of said power members therefrom.

7. Precision motive apparatus comprising an angularly movable output member, motive means including two power members both capable of developing torques simultaneously for powering said output member in different angular directions, clutch means including two helically coiled spring-clutch portions each selectably windable to clutch a different one of said power members in driving relationship to said output member, means angularly interconnecting said output member with an end of each of said helically coiled portions, means angularly interconnecting the opposite ends of said helically coiled portions in a counterbalanced wound relationship wherein the helical windings of said spring-clutch portions tend to slip with substantially the same small slippage torques between said output member and each of said power members, and input control means for selectably increasing the clutching forces in either of said clutch portions to unbalance said counterbalanced relationship, and, thereby, to clutch one of said power members with said output member while de-clutching the other of said power members therefrom.

8. Precision motive apparatus comprising a rotatable output member having substantially cylindrical clutching surfaces, motive means including two counter-rotating power members each having a substantially cylindrical clutching surface, spring-clutch means including two helically coiled portions each wrapped for clutching engagement with the cylindrical surfaces of a different one of said power members and said output member, means angularly interconnecting said helically coiled portions in a counterbalanced relationship wherein angular resilience of the windings of both of said helically coiled portions preserves said portions partly unwrapped from said surfaces such that substantially the same small slippage torques of opposite sense are developed between each of said power members and said output member, and input control means for selectably increasing the clutching forces in either of said clutch portions to unbalance said counterbalanced relationship, and, thereby, to clutch one of said power members with said output member while de-clutching the other of said power members therefrom.

9. Precision motive apparatus as set forth in claim 8 further comprising means mounting said counter-rotating power members collinearly with said cylindrical surfaces of said output member therebetween, and wherein said means angularly interconnecting said helically coiled portions comprises rotatable means having angularly adjustable means for locking the ends of said helically coiled portions together in fixed angular relationship which preserves said portions partly unwrapped from said surfaces.

10. Precision motive apparatus as set forth in claim 9 wherein said input control means comprises means for rotating said rotatable means to selectably wrap either of said portions firmly into clutching engagement with said surfaces of said output member and a different one of said power members.

11. Precision motive apparatus comprising an angularly movable output member, motive means including two power members both capable of developing torques simultaneously for powering said output member in different angular directions, clutch means including two coiled spring-clutch portions each selectably windable to clutch a different one of said power members in driving relationship to said output member, means angularly interconnecting said output member with an end of each of said coiled portions, means interconnecting said coiled portions in a counterbalanced wound relationship wherein the windings of said spring-clutch portions tend to slip with substantially the same small slippage torques between said output member and each of said power members, input control means for selectably increasing the clutching forces in either of said clutch portions to unbalance said counterbalanced relationship, and, thereby, to clutch one of said power members with said output member while de-clutching the other of said power members therefrom, and feedback means actuating said input control means in accordance with net torques experienced by said output member.

12. Precision motive apparatus comprising a rotatable output member, motive means including two counter-rotating power members both capable of developing torques simultaneously for powering said output member in different angular directions, clutch means including two helically coiled spring-clutch portions each selectably windable to clutch a different one of said power members in driving relationship to said output member, means angularly interconnecting said output member with an end of each of said helically coiled portions, means angularly interconnecting the opposite ends of said helically coiled portions in a counterbalanced wound relationship wherein the helical windings of said spring-clutch portions tend to slip with substantially the same small slippage torques between said output member and each of said power members, input control means for angularly moving said interconnecting means to selectably increase the clutching forces in either of said clutch portions to unbalance said counterbalanced relationship, and, thereby, to clutch one of said power members with said output member while de-clutching the other of said power members therefrom, and feedback means angularly moving said input control means responsive to angular movements of said output member.

13. Precision motive apparatus as set forth in claim 12 wherein said feedback means moves said input control means in angular directions to reduce said unbalance in said counterbalanced relationship.

14. Precision motive apparatus comprising a framework, output member mounted for rotation on said framework, motive means including two counter-rotating power members mounted on said framework and both capable of developing torques simultaneously for powering said output member in different angular directions, clutch means including two helically coiled spring-clutch portions each selectably windable to wrap with and clutch a different one of said power members in driving relationship to said output member, means angularly interconnecting said output member with one end of each of said helically coiled portions, means journalled on said framework angularly interconnecting the opposite ends of said helically coiled portions in a counterbalanced wound relationship wherein the helical windings of said spring-clutch portions tend to unwrap and to slip with substantially the same small slippage torques between said output member and each of said power members, and input control means for selectably increasing the clutching forces in either of said clutch portions to unbalance said counterbalanced relationship, and, thereby, to clutch one of said power members with said output member while de-clutching the other of said power members therefrom.

15. Precision motive apparatus as set forth in claim 14 wherein said helically coiled portions comprise the two halves of one helically wound spring, said one end of each of said portions being integral with that of the other.

16. Precision motive apparatus as set forth in claim 15 wherein said helically coiled portions are angularly interconnected with said output member by an interference fit therebetween, and wherein said interference fit is undisturbed by the counterbalanced wound relationship of said coiled portions.

17. Precision motive apparatus comprising a framework, an output member mounted for rotation on said framework and having peripheral clutching surfaces, motive means including two counter-rotating power members mounted on said framework and both capable of developing torques simultaneously for powering said output member in different angular directions and each having a substantially cylindrical clutching surface, clutch means including two helically coiled spring-clutch portions each wrapped for selectable clutching engagement with a different one of said power members and said output member, means angularly locking said output member with an end of each of said helically coiled portions, means journalled on said framework angularly interconnecting the opposite ends of said helically coiled portions in a counterbalanced wound relationship wherein the helical windings of said spring-clutch portions tend to unwrap and slip with substantially the same small slippage torques between said output member and each of said power members, input control means for angularly moving said interconnecting means to selectably increase the clutching forces in either of said clutch portions to unbalance said counterbalanced relationship, and, thereby, to clutch one of said power members with said output member while de-clutching the other of said power members therefrom, and feedback means angularly moving said interconnecting means in accordance with movements of said output member and in directions to reduce the unbalance in said counterbalanced relationship.

18. Precision motive apparatus as set forth in claim 17 including means mounting said output member intermediate and collinear with said power members and mounting said interconnecting means for angular adjustment about an axis of rotation common to said output member, power members, and spring-clutch portions.

References Cited by the Examiner

UNITED STATES PATENTS

| | | | |
|---|---|---|---|
| 2,819,778 | 1/58 | Kosch | 192—8 |
| 2,939,329 | 6/60 | Doerries | 74—388 |
| 3,008,558 | 11/61 | Bennett et al. | 74—388 X |
| 3,048,050 | 8/62 | Perryman | 74—388 |
| 3,084,564 | 4/63 | Miller | 74—388 |

FOREIGN PATENTS

| | | |
|---|---|---|
| 526,314 | 9/40 | Great Britain. |

DON A. WAITE, *Primary Examiner.*